Feb. 7, 1939.   S. J. NORDSTROM   2,146,404
VALVE
Filed July 13, 1936   2 Sheets-Sheet 1
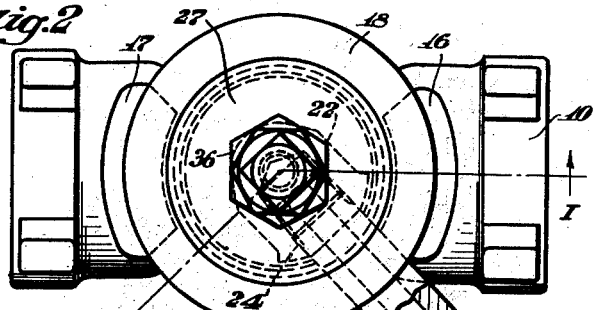
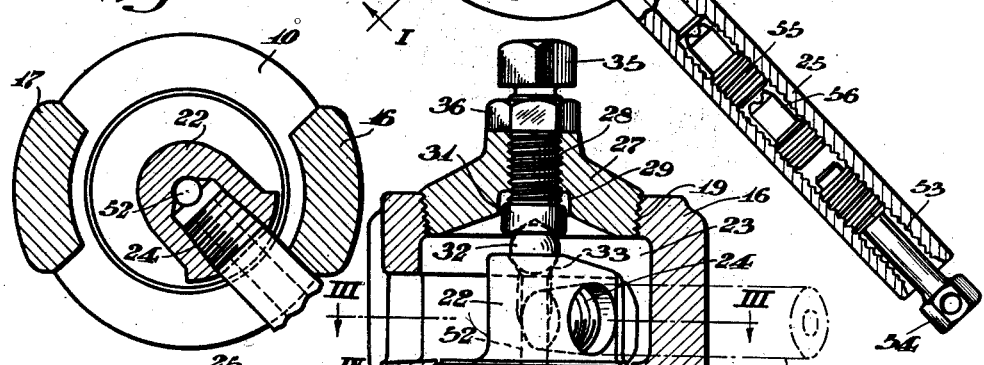
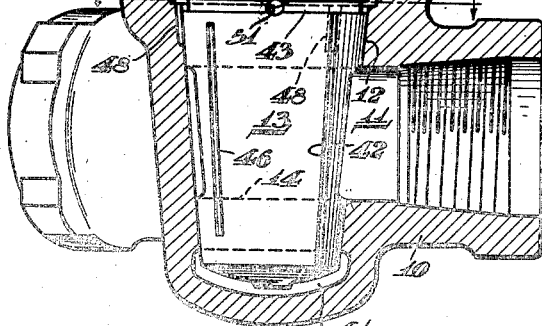
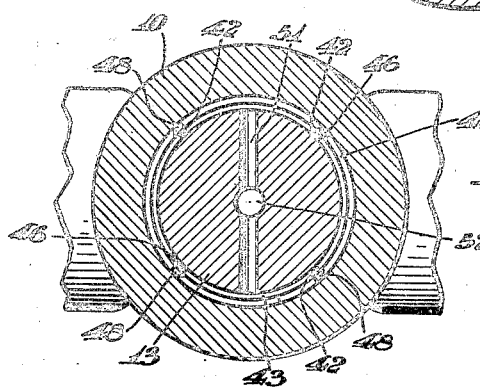
INVENTOR.
SVEN J. NORDSTROM.
BY Lewis D. Konigsford
ATTORNEY.

Feb. 7, 1939.　　　S. J. NORDSTROM　　　2,146,404
VALVE
Filed July 13, 1936　　2 Sheets-Sheet 2
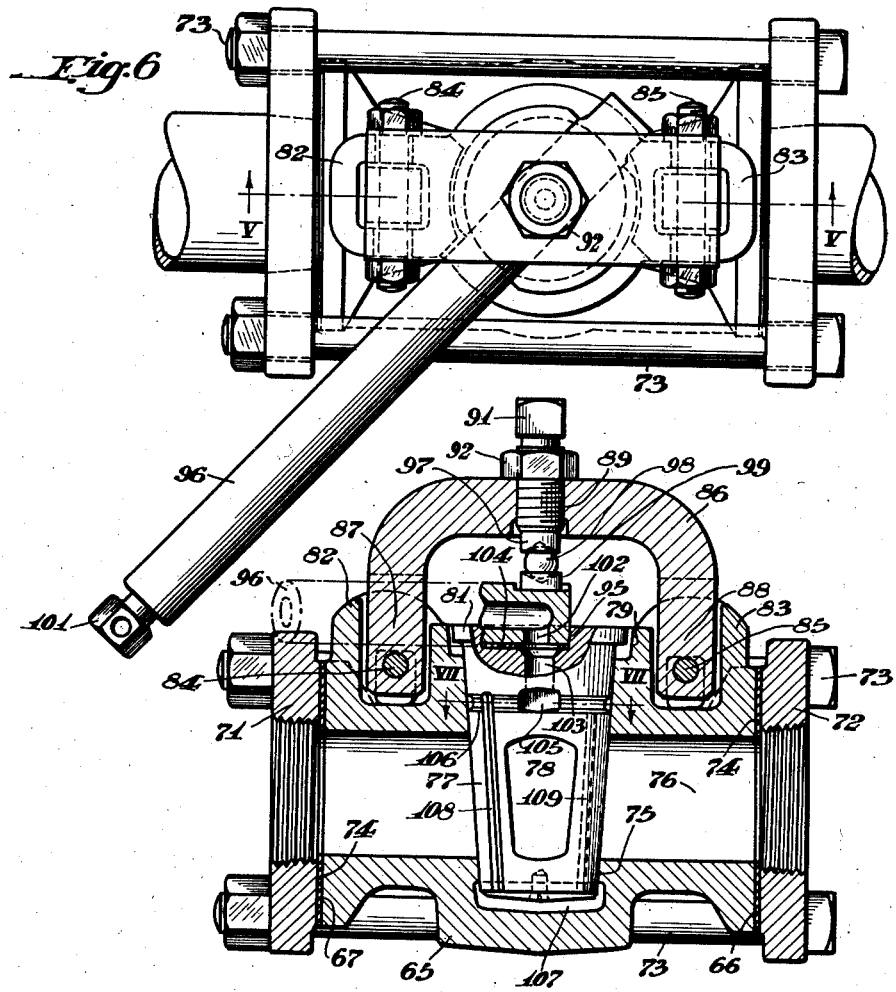
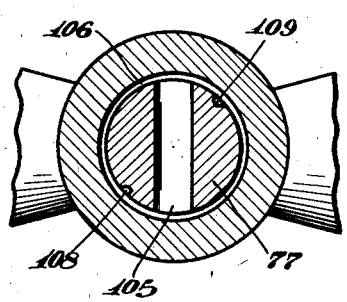
INVENTOR.
SVEN J. NORDSTROM.
BY
ATTORNEY.

Patented Feb. 7, 1939

2,146,404

UNITED STATES PATENT OFFICE 2,146,404

VALVE

Sven J. Nordstrom, Piedmont, Calif., assignor to Merco Nordstrom Valve Company, Pittsburgh, Pa., a corporation of Delaware Application July 13, 1936, Serial No. 90,358

6 Claims. (Cl. 251—93)

This invention relates to valves, and particularly relates to plug valves of the lubricated type.

According to the present invention, I provide a valve which utilizes the inherent resiliency of a metal plate or yoke to maintain the plug seated on its seat against lifting action of line or lubricant pressure, and I seal the exposed end of the plug by an arrangement of lubricant grooves in the seating surface of the plug and casing whereby it is not necessary to employ a stuffing box to prevent leakage of line fluid from the valve. I use an operating handle for the valve which is more or less permanently connected therewith, and provision is made to lubricate the valve by making the handle hollow to receive lubricant and providing a suitable connection between the operating handle and the lubricating system of the plug. In the preferred embodiment the operating handle cooperates with the side pillars of the yoke construction to limit rotating movement of the valve to full open and full closed positions. The yoke also may be constructed so that should the holding means for the valve be rendered accidentally inoperative, the operating handle will retain the plug against complete removal.

Accordingly, it is an object of my invention to provide a plug valve in which stuffing boxes and similar packing means may be entirely eliminated.

A further object is the provision of a valve having an inherently resilient metal member for maintaining the plug on its seat, said member being normally out of contact with line fluid.

A further object is the provision of a plug valve having an operating member which performs the multiple functions of a lubricant reservoir and rotational stop, and prevents complete removal of the plug upon accidental removal of the plug holding means.

A further object of the invention is the construction of a valve in a design which is suitable for manufacture from a variety of materials, such as acid resisting ceramics and alloys having brittle characteristics.

These and other objects will be apparent from a consideration of the following specification taken in connection with the accompanying drawings wherein:

Figure 1 shows a preferred modification of the invention in partial vertical section taken on line I—I of Figure 2;

Figure 2 is a plan view of Figure 1, the operating handle being shown partially in section;

Figure 3 is a horizontal section taken on line III—III of Figure 1;

Figure 4 shows a horizontal section taken on line IV—IV of Figure 1;

Figure 5 shows a further modification in vertical section on line V—V of Figure 6;

Figure 6 is a plan view of Figure 5; and

Figure 7 is a horizontal section taken on line VII—VII of Figure 5.

Referring particularly to Figures 1 to 4 of the drawings, there is shown a valve body or casing 10 having a passageway 11 therethrough for flow of fluid and a tapered seat 12 extending transversely of the passageway in which there is seated a tapered plug 13 having a port 14 therethrough adapted to register with the passageway 11 in open position of the valve. The valve body has two upright columns or pillars 16 and 17 at one end which preferably are integral with the casing, and are connected at their upper ends by a ring or flange 18 which has a threaded bore 19 therethrough substantially coaxial with the tapered seat 12. The plug 13 has an extension 22 at its larger end which extends into the space 23 provided between the pillars 16, 17 and the flange 18, and this extension is bored and threaded transversely of its axis at 24 to receive a valve operating handle 25 therein.

Means is provided for resiliently holding the plug on its seat with a minimum of friction. The threaded bore 19 in the flange 18 receives a resilient plate 27 of die forged or cast steel which is threaded therein. The plate 27 is centrally bored and threaded at 28 and is counterbored at 29 to receive a thrust disk which is forced against the hardened steel ball 32 in the conical recess 33 in the end of extension 22 by a screw 35 threaded into the bore 28 and bearing against the thrust disk 31. This plate 27 is heavy enough so that it will exert sufficient seating force to hold the plug in its seat against line fluid, and has sufficient resilience so that it will yield enough to enable jacking of the plug from its seat by lubricant pressure as will hereinafter appear. By adjusting the screw 35 the reacting resilient thrust exerted by the resilient plate 27 upon the plug may be increased or decreased as desired. The screw 35 is locked in adjusted position by the lock nut 36.

The lubricant system for the valve includes a lubricant chamber 41 formed at the smaller end of the plug by the plug and body, and a plurality of lubricant grooves in the seating surface of the plug and casing. Each blank wall of the plug has a longitudinal groove 42 which extends to the smaller end of the plug and communicates with the chamber 41 and at its top extends to a circumferential groove 43 which passes completely around the circumference of the plug adjacent its larger end. I prefer to form additionally a circumferential groove 44, positioned opposite the similar circumferential groove 43, in the seat of the casing so that in lapping the plug into its seat there will be no possibility of forming a ridge in the seat. The lubricant grooves thus provide an annulus of lubricant about the larger end of the plug to prevent leakage of line fluid to the exterior at the larger end. At the other side of each blank wall of the plug there is a longitudinal groove 46 which terminates short of the circumferential groove 43 and short of the smaller end of the plug. The casing seat has four diametrically opposite dwarf longitudinal grooves 48 connected to the circumferential groove 44 in the seat, which are so disposed that when the valve is in fully opened or fully closed position the dwarf grooves 48 serve as a means of communication between the longitudinal grooves 46 and the circumferential grooves 43 and 44.

Lubricant is supplied to the plug lubricating system through a diametrical lubricant passageway 51 in the plug which is in communication with the longitudinal lubricant passageway 52 extending substantially axially of the plug and closed in any suitable manner at its outer end by a plug. The operating wrench or handle 25 is hollow and is threaded as indicated at 53 at its outer end to receive a lubricant compressing screw 54. Two or more check valve bodies 55 and 56 preferably are inserted in the handle to prevent reflux of lubricant therethrough when the lubricant screw 54 is removed.

As shown in Figure 2, the valve is in open position with the handle 25 abutting right hand pillar 16 on the casing which thus serves as a stop to indicate the position of the valve. The valve is closed by turning the handle 25 to the left as there shown until the handle 25 abuts the end of the other pillar 17. The screw 35 is adjusted so that the plug will not be lifted to any appreciable extent by line pressure, the seating thrust being transmitted with a minimum of frictional resistance to turning by the ball 22 and thrust disk 31. The valve is lubricated by inserting a stick of lubricant into the threaded bore 53 in the handle and forcing this lubricant by means of the lubricating screw 54 through the hollow handle down the longitudinal passageway 52 and through diametrical passageway 51 into the circumferential grooves 43 and 44, from which the lubricant is distributed in the full opened or full closed positions longitudinally of the valve surface by the longitudinal grooves 42 and 46 and dwarf grooves 48 to the lubricant chamber 41 at the smaller end of the plug. By developing sufficient pressure with the lubricant screw 54, the plug may be jacked off its seat by the pressure transmitted to the lubricant chamber 41 and assisted to a slight extent by the vertical component of the pressure in the grooving system in the plug surface and seat, the resilient thrust of the plate 27 acting to reseat the valve on its lubricated seat. Should the plug be accidentally raised out of its seat the ring 18 will engage the handle 25 to prevent entire removal of the plug.

In the modification shown in Figures 5, 6 and 7, the valve is designed to be made of brittle material such as high silicon iron, ceramic material or the like. Because of the nature of this material it cannot be machined satisfactorily, and in the design of this valve the surfaces to be machined are reduced to a minimum, grinding being resorted to wherever possible. The valve comprises a body 65 of generally cylindrical form having smooth flange faces 66 and 67 at its ends. In order to enable this valve to be connected into a pipe line by screw threads, there are two end plates 71 and 72 bolted to the flange faces by means of four horizontal bolts 73, suitable gaskets 74 being interposed between the threaded flanges and the valve body faces to prevent leakage. A tapered seat 75 is formed transversely of the passageway 76 through the valve body 65, this seat being ground or machined in the body in any suitable manner. A tapered plug 77 is seated in the seat and has a passageway 78 cored therethrough to communicate with the passageway 76 in open position of the valve. The seat in the casing is relieved at the larger end as indicated at 79, and the plug 77 has a flange 81 at its top partly filling this relieved area and overlying the tapered valve seat.

There are two lugs 82 and 83 formed on the top of the body integral therewith at the opposite ends thereof, these lugs having horizontal holes therein to receive transverse bolts 84 and 85 respectively. The yoke 86 is made of die forged or cast steel and has reduced ends 87 and 88 which are received in the lugs 82 and 83 and are transversely bored to allow the bolts 84 and 85 to pass therethrough, whereby the yoke is held in assembled position. The yoke 86 has a certain amount of inherent resilience due to its shape and to the material from which it is made. This yoke is bored and threaded centrally at 89 to receive a screw 91 adapted to be locked in adjusted position by a lock nut 92.

The larger end of the plug 77 has a diametrical recess 95 in its larger end which receives a hollow operating handle 96 held in position by the screw 91 which bears thereon through a thrust disk 97, hardened steel ball 98 and seating disk 99. The stem or handle 96 is hollow and internally threaded to receive the lubricant screw 101 and has a transverse bore 102 which registers with a central cored hole 103 in the plug 77 to supply lubricant thereto. A gasket 104 is inserted between the handle 96 and the bottom of slot 95 to prevent escape of lubricant. The cored central hole 103 communicates with a diametrical cored hole 105 which in turn communicates with the circumferential groove 106 formed in the plug surface. A lubricant chamber 107 is formed at the smaller end of the plug between the plug and casing, and two diametrically opposite longitudinal grooves 108 and 109 connect the circumferential groove 106 therewith.

In operation, the handle 96 is employed to rotate the valve between opened and closed position, and the ends of the lugs 82 and 83 serve as stops to limit rotation thereof. The plug is maintained seated by the resilient thrust of the yoke 86 transmitted by the screw 91, disk 97, ball 98, disk 99 and handle 96 to the valve plug to maintain it on the its seat against line pressure, and this thrust can be adjusted by rotating screw 91. The yoke 86 is not in contact with line fluid and therefore may be made of a die forging or cast steel which has the inherent resilience required for this purpose. The plug is lubricated and jacked as described in connection with the modification shown in Figures 1 to 4.

The invention may be embodied in other specific forms without departure from the spirit or essential characteristics of the present invention The specific form described herein therefore is to be considered in all respects as illustrative and not restrictive of the invention.

What is claimed and desired to be secured by United States Letters Patent is:—

1. A valve comprising a casing having a passageway therethrough for flow of fluid and a seat formed transversely of the passageway, a rotatable plug disposed in said seat and having a port therethrough adapted to register with the passageway in open position of the valve, an inherently resilient holding member at the larger end of the plug held in spaced relation with the casing, a hollow operating handle extending laterally from the plug between the holding member and casing, the casing being formed to prevent removal of the valve in the absence of the holding means, and means to compress lubricant in the hollow handle to lubricate the valve.

2. A valve comprising a casing having a passageway therethrough for flow of fluid and a seat formed transversely of the passageway, a rotatable plug disposed in said seat and having a port therethrough adapted to register with the passageway in open position of the valve, means at the larger end of the plug for resiliently holding the plug on its seat, means providing stops to limit the rotation of the plug, a hollow operating handle extending transversely of the plug axis detachably secured to the plug and adapted to cooperate with said stops and providing a reservoir for lubricant, and means for compressing the lubricant in said reservoir to lubricate the seating surface of the plug and casing.

3. A plug valve comprising a casing having a passageway therethrough for flow of fluid and a seat formed transversely of the passageway, a plug located in the seat and having a port therethrough adapted to register with the passageway in open position of the valve, means for resiliently urging the plug into its seat, a lubricant passage in the plug, and a hollow handle extending transversely of the plug axis for containing lubricant detachably secured to the plug in fluid tight relationship to said passage.

4. A plug valve comprising a casing having a passageway therethrough for flow of fluid and a seat formed transversely of the passageway, a plug located in the seat and having a port therethrough adapted to register with the passageway in open position of the valve, means for resiliently urging the plug into its seat, a lubricant passage in the plug, a hollow handle for containing lubricant extending transversely of the plug axis and detachably secured to the plug in fluid tight relationship to said lubricant passage, and a lubricant compressing screw in said handle.

5. A plug valve comprising a casing having a passageway therethrough for flow of fluid and a seat formed transversely of the passageway, a plug located in the seat and having a port therethrough adapted to register with the passageway in open position of the valve, means for resiliently urging the plug into its seat, a lubricant passage in the plug, a hollow handle for containing lubricant extending transversely of the plug axis and detachably secured to the plug in fluid tight relationship to said lubricant passage, a check valve in said handle, and a lubricant compressing screw in said handle.

6. A valve comprising a casing, having a passageway therethrough for flow of fluid and a tapered seat opened at the larger end formed transversely of the passageway, a plug located in said seat and having a port therethrough adapted to register with the passageway in open position of the valve, a circumferential lubricant groove in the seating surface of the plug and casing to prevent escape of line fluid at the larger end of the plug, a hollow operating handle extending transversely of the plug axis at the larger end of the plug and detachably secured to the plug, a lubricant channel connecting the hollow handle with said circumferential groove, and inherently resilient means disposed at the side of the handle opposite the plug and secured to the casing for maintaining the plug on its seat.

SVEN J. NORDSTROM.